United States Patent [19]
Wu et al.

[11] 4,175,618
[45] Nov. 27, 1979

[54] HIGH VERTICAL AND HORIZONTAL CONFORMANCE THERMAL OIL RECOVERY PROCESS

[75] Inventors: Ching H. Wu, Golden, Colo.; Alfred Brown, Houston; Wilbur L. Hall, Bellaire, both of Tex.; Russell D. Shupe, Ponca City, Okla.

[73] Assignee: Texaco Inc., White Plains, N.Y.

[21] Appl. No.: 904,703

[22] Filed: May 10, 1978

[51] Int. Cl.$^2$ .......... E21B 43/22; E21B 43/23
[52] U.S. Cl. .......... 166/252; 166/263; 166/272; 166/273
[58] Field of Search .......... 166/272, 252, 274, 273, 166/263

[56] References Cited

U.S. PATENT DOCUMENTS

| | | | |
|---|---|---|---|
| 3,208,517 | 9/1965 | Binder, Jr. et al. | 166/274 |
| 3,279,538 | 10/1966 | Doscher | 166/272 X |
| 3,490,532 | 1/1970 | Carlin | 166/272 X |
| 3,508,612 | 4/1970 | Reisberg et al. | 166/274 |
| 3,637,018 | 1/1972 | Kelly et al. | 166/272 |
| 3,690,376 | 9/1972 | Zwicky et al. | 166/272 |
| 3,731,741 | 5/1973 | Palmer et al. | 166/272 |
| 3,811,504 | 5/1974 | Flournoy et al. | 166/274 X |
| 3,854,531 | 12/1974 | Carlin | 166/272 |
| 4,058,467 | 11/1977 | Sias | 166/274 X |
| 4,077,471 | 3/1978 | Shupe et al. | 166/272 X |

FOREIGN PATENT DOCUMENTS 1004977 2/1977 Canada .................. 166/272

OTHER PUBLICATIONS

Doscher, "After 10 Years, What's the Score on Use of Steam in Oil Production?", The Oil and Gas Journal, Nov. 22, 1965, pp. 58-61.

*Primary Examiner*—Stephen J. Novosad
*Attorney, Agent, or Firm*—Thomas H. Whaley; Carl G. Ries; Jack H. Park

[57] ABSTRACT

Thermal oil recovery processes employing the injection of steam and/or hot water for mobilizing viscous petroleum sweep only a small fraction of the formation between the wells because of override, underride, or channeling resulting in poor vertical conformance, as well as poor horizontal conformance of the swept portion of the formation. Both vertical and horizontal conformance are improved significantly if steam is injected into a formation until channeling has begun, after which steam injection is terminated and an aqueous fluid is injected into the formation, which has a viscosity essentially the same as water and contains an emulsifying agent capable of forming a viscous emulsion in the portions of the formation where override, underride or channeling has occurred. After a small slug of emulsifying fluid has been injected, steam injection is resumed and as a consequence of the emulsion plug, moves into portions of the formation from which oil would not be recovered if the emulsion had not been injected. Multiple cycles of steam and emulsion injection may be applied to a formation to more completely sweep the full volume of the pattern. Surfactants suitable for use include organic sulfonates such as petroleum sulfonate, and solubilizing co-surfactants such as alkyl or alkylarylpolyethoxyalkylene sulfonates.

24 Claims, 9 Drawing Figures

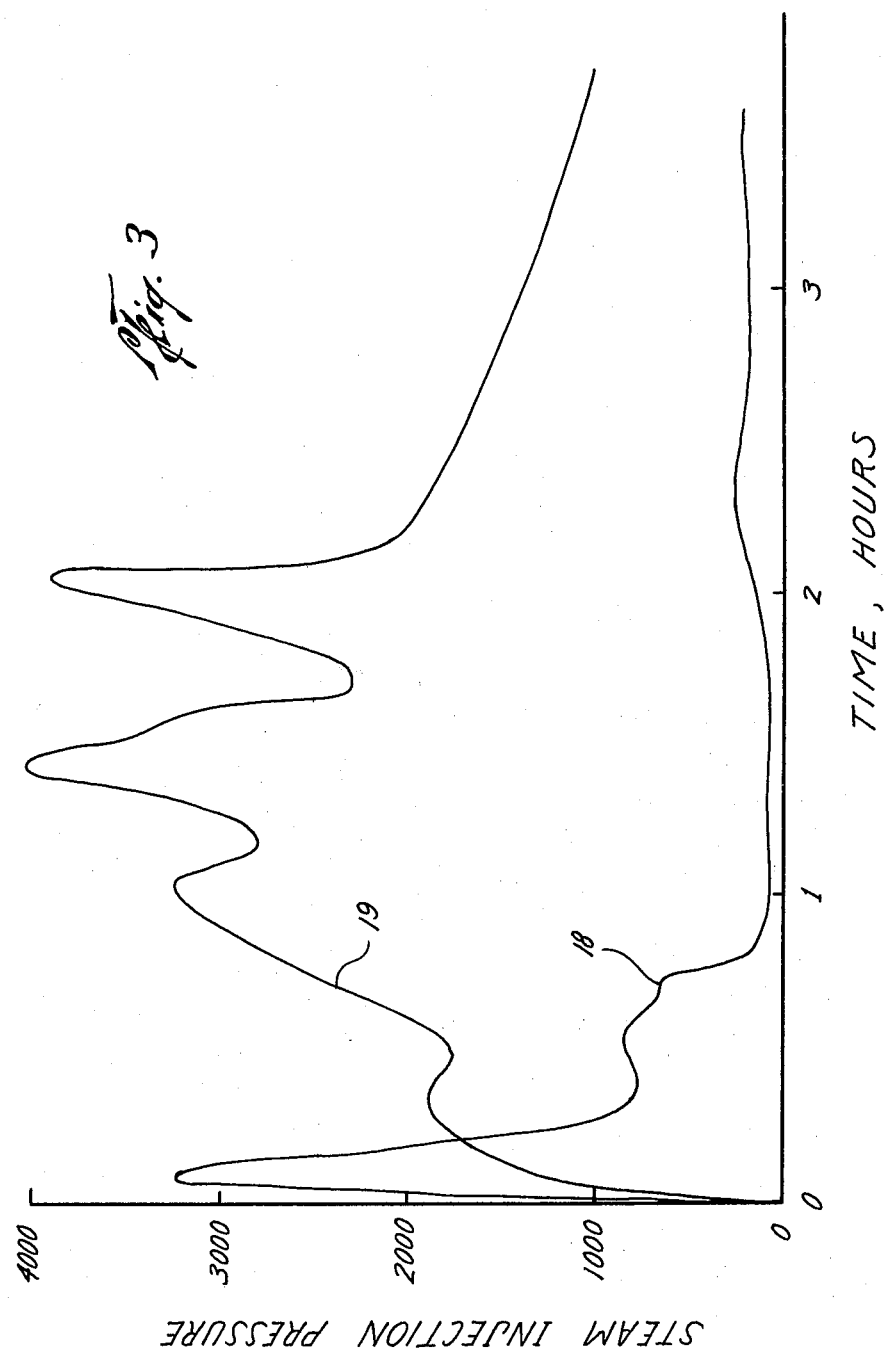

HIGH VERTICAL AND HORIZONTAL CONFORMANCE THERMAL OIL RECOVERY PROCESS

FIELD OF THE INVENTION

This invention concerns a thermal oil recovery process such as steam and/or hot water injection in which the vertical and horizontal conformance is improved significantly by alternately injecting steam and an aqueous fluid containing an emulsifying surfactant to form a coarse, viscous emulsion in the steam swept zones in the formation, followed by additional steam and/or hot water injection.

BACKGROUND OF THE INVENTION

It is well recognized by persons skilled in the art of recovering oil or petroleum from subterranean deposits thereof that only a small fraction of viscous petroleum may be recovered from subterranean formations by conventional primary and secondary means, and some method such as a thermal recovery process or other treatment must be applied to the formation to reduce the viscosity of the petroleum to a level at which it will flow readily to wells from which it can be recovered to the surface of the earth. Steam and/or hot water flooding are commonly used for this purpose, and have been very successful in some formations for stimulating recovery of viscous petroleum which is otherwise essentially unrecoverable.

Problems are encountered in applying steam flooding to subterranean formations containing very viscous petroleum, which are especially severe if the vertical thickness of the formation is quite high. Because steam is much less viscous than the viscous petroleum present in the formation, and further because the density of vapor phase steam is significantly less than the density of petroleum, there is a strong tendency for steam injection even near the bottom of the oil-saturated portion of the formation, to channel into the top of the formation, referred to as steam override. Once steam override has begun, continued injection of steam into the formation will accomplish very little additional petroleum recovery. Steam breakthrough at the production well completes a high permeability path between the injection well and the production well across the top of the formation, and steam injected thereafter will continue to channel through the steam-swept channel at the top of the formation and will displace very little additional viscous petroleum from the portion of the formation below the channel. This problem is so severe that vertical sweep efficiencies as low as 10–15 percent are not uncommon. The poor mobility ratio between steam and viscous petroleum also results in relatively poor horizontal conformance, and so the total volumetric sweep efficiency of a steam flood is poor.

In view of the foregoing discussion, it can be appreciated that there is a significant need for improving the vertical and horizontal sweep efficiency of steam flooding and other thermal oil recovery methods.

While techniques have been proposed in the art for treating the injection well to cure an adverse permeability distribution problem, these treatments only affect the portion of the formation immediately adjacent to the wellbore. While the permeability of the steam zone in the portion of the formation immediately adjacent to an injection well may be treated to reduce its permeability, the effect is limited to the near wellbore zone and steam quickly channels back to the original swept portion of the formation, once the fluid has traveled a short distance away from the injection well where the treatment was applied.

In view of the foregoing discussion, it can be appreciated that there is a need for a method for treating the formation so as to effect reduction in the permeability of the steam-swept channels at significant distances between the injection well and the production well.

DESCRIPTION OF THE PRIOR ART

Attempts to accomplish in-depth treatment of high permeability streaks, either naturally occurring or those formed as a consequence of steam channeling in formations, have been described in the prior art and include techniques using viscous emulsions which are formulated on the surface and injected in the subterranean formation. Injection of viscous fluids into steam-swept zones is difficult and frequently results in the fluids invading only a limited number of the larger flow channels within the formation, and bypassing many other smaller flow channels which would be invaded by steam or water because of their lower viscosities.

The following U.S. patents describe processes for forming viscous emulsions on the surface of the earth and injecting them into formations for the purpose of decreasing the permeability of zones in the formations which are more permeable than other portions of the formation. U.S. Pat. No. 3,149,669; U.S. Pat. No. Re. 27,198 (original U.S. Pat. No. 3,443,636); U.S. Pat. Nos. 3,502,146 (1970); and 3,866,680 (1975). U.S. Pat. Nos. 3,946,812; 3,888,308; 3,508,612; 3,500,923; 3,827,497; 3,811,504 and 3,890,239 relate to the use of sulfated ethoxylated surfactants in oil displacing fluids. U.S. Pat. Nos. 3,792,731; 3,799,264; 3,811,504 and 3,811,505 describe oil recovery processes and fluids employing nonionic surfactants. U.S. Pat. Nos. 3,827,497 and 3,890,239 disclose the use of a mixture of organic sulfonate and a sulfated or sulfonated, ethoxylated alcohol.

SUMMARY OF THE INVENTION

We have discovered an improved thermal process for recovering viscous oil from a subterranean formation involving steam flooding by means of which the vertical and horizontal conformance of the steam flood can be improved significantly over that obtainable with conventional processes using steam and/or hot water injection. Our process contemplates an initial step essentially the same as prior art techniques for recovering viscous oil, namely injecting steam and/or hot water, which may include other additives for the purpose of increasing the mobilization effectiveness of thermal oil recovery fluid, but only for a period of time until channeling, overriding, or other adverse mobility phenomena are suspected or detected in the formation. After steam channeling of some form has begun and preferably before steam breakthrough has occurred at the production well, steam injection is terminated and an aqueous fluid is injected into the formation. The viscosity of the aqueous fluid should be not more than twice the viscosity of water, to ensure that the injection fluid invades essentially the same flow channels as water would invade in the formation, thus occupying the steam-swept channels in the viscous oil formation. The aqueous fluid is a surfactant solution or relatively low oil content micellar dispersion. If a dispersion or emulsion is employed, the quantity of hydrocarbon in the dispersed or discontinuous phase of the emulsion must be maintained below the concentration which would cause the viscosity of the emulsion to be significantly greater than water, preferably no more than twice the viscosity of water. The surfactant should be one which promotes the formation of a stable, coarse, viscous emulsion with formation petroleum under the conditions existing in the formation at that time. Since the portions of the formation swept by the injected thermal fluid will have been heated by the thermal fluid, the temperature of the portion of the formation to be treated may be significantly greater than the original formation temperature. Accordingly, surfactants which would be stable at normal formation temperatures but are unstable at the temperature of steam are not suitable for use in this process since they will encounter higher temperatures of the steam swept zones. Similarly, the salinity of the fluid present in the steam swept zones may be less, in some instances significantly less, than the salinity of the connate water present in the pore spaces of the formation prior to injecting steam, since steam condensate is relatively fresh water. The surfactant combination must be carefully tailored and balanced to achieve optimum formation of a viscous emulsion at the salinity present in the swept zones and at the temperature of the swept zones. Not only does this ensure the optimum emulsification will occur in the steam swept, high permeability zones, but it ensures that there will be less tendency for the emulsification phenomena to occur in the portions of the formation which have not yet been swept by steam. Suitable surfactants include petroleum sulfonates and other organic sulfonates in combination with solubilizing co-surfactants such as alkyl or alkylarylpolyalkoxyalkylene sulfonates. Low HLB nonionic surfactants and low molecular weight alcohols are also useful for stabilizing the emulsion and may be included in the treating fluid.

BRIEF DESCRIPTION OF THE DRAWING

FIG. 1A shows steam override occurring in a formation, FIG. 1B shows the position of the emulsion block placed in accordance with the practice of our invention, and FIG. 1C shows how additional amounts of formation is swept as a result of placing the emulsion block in the swept zone. FIGS. 1D and 1E show subsequent cycles of treatment and steam injection.

FIG. 2A shows the way the problem occurs in conventional steam flooding, FIG. 2B shows the placement of the emulsion plug in the flow channel according to the process of our invention, and FIG. 2C shows how additional vertical thickness of the formation is swept by steam after placing the emulsion plug.

FIG. 3 is a plot of steam injection pressure versus injection time for a laboratory test of our process and, for comparison, a straight through steam injection run.

DETAILED DESCRIPTION OF THE PREFERRED EMBODIMENTS

The process of our invention concerns an improvement in a steam or hot water flooding type of thermal oil recovery method, and more particularly deals with a method of injecting a low viscosity fluid which forms a viscous emulsion plug in the steam-swept channels of the formation, the fluid being injected periodically during the course of steam flooding, so subsequent steam injection will be forced to pass through other sections of the formation.

Figure 1A:
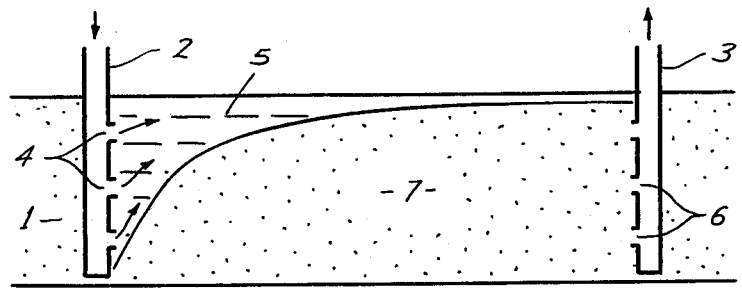
FIGS. 1A, 1B, 1C, 1D and 1E deal with the steam override type of vertical conformance problem.

The process of our invention is best understood by referring to the attached figures, in which FIG. 1A illustrates how a subterranean formation 1 penetrated by an injection well 2 a production well 3, responds to a normal forward steam or hot water displacement. The injected thermal fluid passes into the formation by perforations 4 of well 2, and begins penetrating into the formation. Oil is mobilized as a consequence of being heated by the injected thermal fluid, and an oil bank is formed (not shown in the figure) which is displaced through the formation toward production well 3 from which it is recovered to the surface of the earth. The oil bank may be displaced by steam or by steam condensate which forms as steam cools as it passes through the formation. Steam migrates upward because its density is much less than the density of oil present in the lower portions of the formation. Once a portion of the formation 5 has been swept by steam passing horizontally through the formation to at least one of the perforations 6 of producing well 3, the problem of premature steam breakthrough is recognized. Since various petroleum has been removed from the portions of the pore spaces of swept zone 5, the permeability to steam is much greater in zone 5 than it is in the undepleted portion of the formation 1. Once the high permeability swept zone 5 has been established connecting injection well 2 and production well 3, further injection of steam into the formation will result in steam passing only through zone 5 and consequently displacing very little additional viscous petroleum from the portions of the formation 7 below swept zone 5. Many additional pore volumes of steam can be injected, and the total volume of the pattern between wells 2 and 3 swept by the injected thermal recovery fluid may be only from 10 to 15 percent of the total volume of the pattern.

The prior art teaches injecting viscous fluids, such as viscous emulsions formed on the surface of the earth into injection well 2, or solutions of hydrophylic polymers such as polyacrylamide or polysaccharides into formations for the purpose of correcting adverse permeability distribution in certain types of enhanced oil recovery programs. Viscous polymer fluids are not effective for treating steam-swept zones in connection with thermal oil recovery methods because such polymers are not stable at the temperatures which are encountered in the steam-swept zone 5. The viscosity developed by polymers in fluids prepared on the surface of the earth is lost quickly in the subterranean formation after it had been exposed to the elevated temperatures of the steam swept zone. Viscous emulsions are usually unsuccessful in treating permeability problems created in viscous oil formations by steam flooding because the emulsions are difficult to inject into the formation since their viscosity is highest at the time of injection, and so the effectiveness is mostly limited to the portions of the formation very near the wellbore.

Figure 1B:
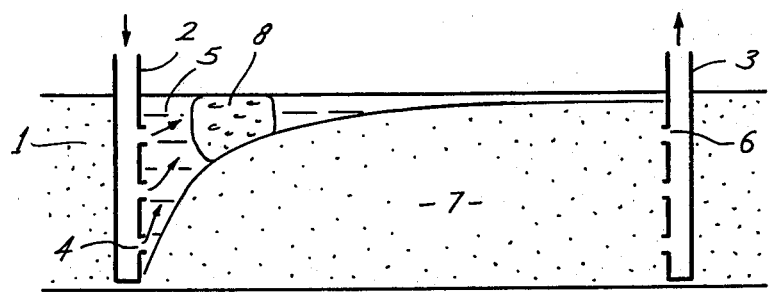

The process of our invention is illustrated by referring to FIG. 1B. A quantity of aqueous fluid, generally a liquid having dissolved therein a small but effective amount of a surface active agent is injected into the formation via injection well 2. The liquid injected into injection well 2 is not a viscous emulsion at the time of injection; rather it is either a low viscosity oil-free aqueous solution, or a low viscosity micellar dispersion or microemulsion, wherein the amount of oil present in the emulsion is insufficient to generate the viscosities which will ultimately be generated for the purpose of plugging the swept zone 5 of the formation. In any application of thermal oil recovery, while the oil saturation in the steam swept zone will be reduced from that present in the formation prior to steam injection, the oil saturation will never be reduced to zero. Our process employs an aqueous emulsifying liquid which is relatively low viscosity at the time of injection, but which forms an emulsion in situ in the depleted flow channels of the formation after it has been injected thereinto, utilizing residual oil remaining in the swept channels of the formation after steam has passed therethrough. Since this residual oil is seldom recoverable by normal enhanced oil recovery techniques, it does not constitute a loss of otherwise recoverable hydrocarbons, and so a significant expensive portion of the fluid utilized to treat the high permeability thief zone is a material already present in the formation which cannot be recovered therefrom by conventional means.

Figure 1C:
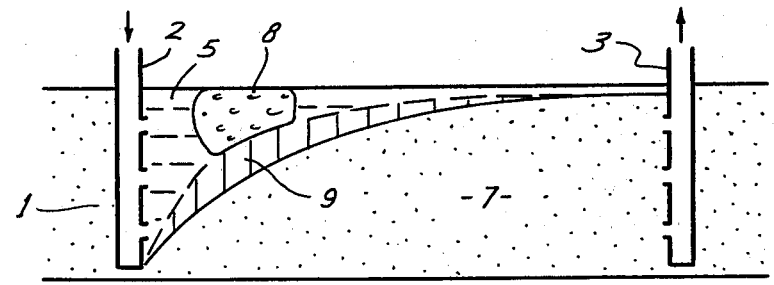
Figure 1D:
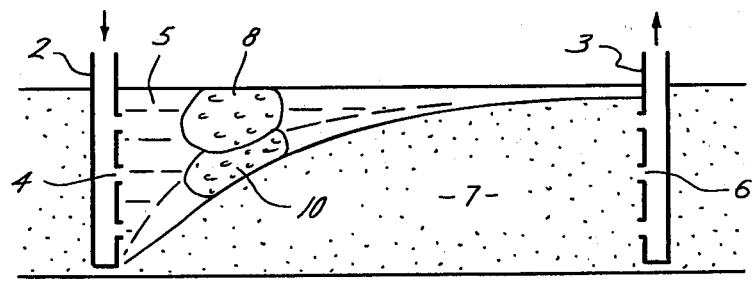
Figure 1E:
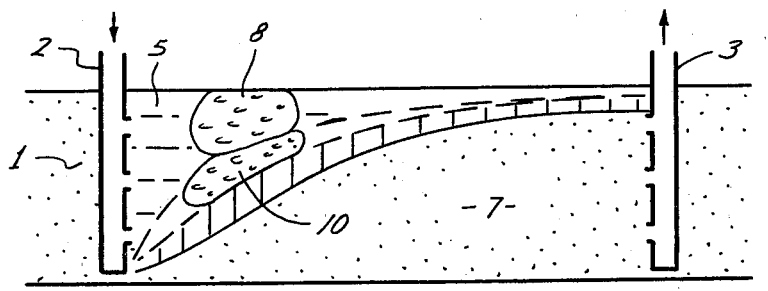

The emulsifying liquid is injected into the formation and then displaced from the formation by injecting water or other drive fluid including hot water or steam. Since the saturation is lowest adjacent the injection well, the emulsifying phenomenon will not occur immediately upon passing into the steam swept zone, but rather will develop slowly as the slug 8 of emulsifying liquid is displaced away from the injection well by the drive fluid injected thereafter. Oil will be emulsified as the slug of emulsifying liquid passes through the steam swept zone, and the viscosity of slug 8 increases as the oil content increases. After passing a distance away from injection well 2, the oil content of slug 8 will have increased sufficiently that its viscosity rises sufficiently to render the slug essentially immobile. This will be determinable on the surface of the earth since the injection pressure will increase significantly as the slug viscosity rises, and at some predetermined value, but below the fracture pressure of the particular overburden, injection of the drive fluid is terminated and additional steam injection is initiated. At that point, steam passes through portions of the formation 7 below the zone 5 originally swept by steam, and at that point steam passes through the formation in precisely the same way it did prior to the first steam injection phase. This phase of the process of our invention is shown in FIG. 1C, and it can be seen how zone 9 represents the increased volume of formations swept by fluid injected into well 2 over that swept by steam in the first steam injection step, which is shown as 5 in all of the FIG. 1 series.

After steam injection is continued for a period of time, steam will again pass into the portion of the original steam swept zone and steam breakthrough at the production well 3 will once again be observed. At this point, as was the case at the end of step 1 illustrated by FIG. 1A, further injection of steam will not recover any significant amount of additional oil.

Once steam breakthrough has again occurred at producing well 3, still another cycle in which an emulsifying aqueous liquid is injected into the formation, and displaced away from the injection well by a suitable drive fluid until the viscosity of the slug increases as a consequence of picking up oil from the steam swept zone. As in the second step described above, the development of sufficient viscosity due to increased oil content of the second slug 10 in FIG. 1D can also be detected on the surface of the earth by increased injection pressure. As the injection pressure increases to a predetermined value which is at all times maintained below the fracture pressure of the overburden formation, steam injection should once again be initiated to further expand a new volume of formation below the second emulsion plug 10, similar to that which is shown in FIG. 1C.

The process of our invention should be continued through repetitive cycles of injecting steam to a predetermined end point which may be steam breakthrough at the producing well or steam injection may be terminated prior to steam breakthrough, followed by injection of the aqueous liquid containing the emulsifying surfactants, and then displacing the liquid slug away from the injection well until its oil content and viscosity have increased to the point where steam injection may be once again resumed. Repetitive cycles result in sweeping a very significant percentage of the formation, and can ultimately approach 100 percent volumetric displacement, although the economics of obtaining such effective displacement may require ending the oil recovery program prior to such point.

Figure 2A:
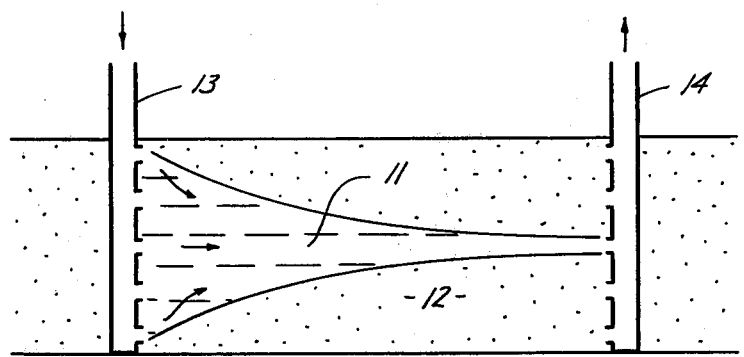
FIGS. 2A, 2B and 2C deal with the steam chaneling problem as may occur due to a high permeability streak in a formation.
Figure 2B:
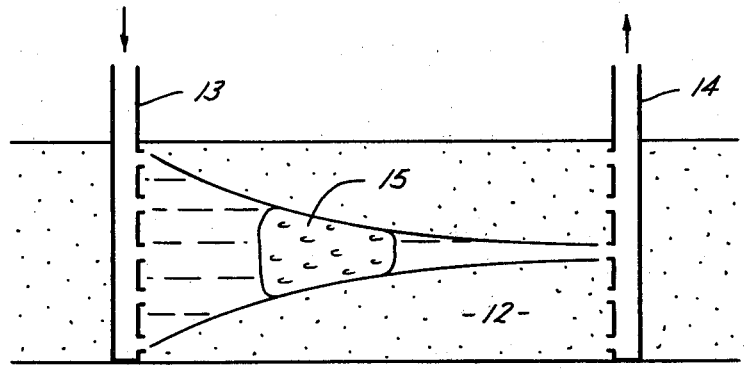

FIG. 2A shows a related problem developing in injecting steam or other thermal recovery fluid into a subterranean formation, in which a swept zone occurs at a point other than the top portion of the oil saturated interval. This is more likely to be encountered in a hot water flood, where the gravity differences between the injected fluid and the formation petroleum are not so great that steam will always flow to the top portion of the oil formation. The swept zone 11 in FIG. 2A may occur as a consequence of slight inhomogenuity of the permeability distribution within formation 12. It is frequently observed that an oil formation, especially a relatively thick oil formation, will be found to be composed of a plurality of horizontal zones of different permeabilities. If one zone exists in the formation having a permeability at least 50 percent higher than the permeability of other portions of the formation, any injected fluid, including hot water and steam, will tend to migrate through that zone, and its effect is shown in FIGS. 2B and 2C.

The aqueous slug of emulsifying liquid 15 is injected into the injection well 13 and then displaced away from the injection well by a suitable drive fluid such as water, hot water or steam. Again, the oil saturation is lowest immediately adjacent to the injection well, and so little viscosity development will occur at the injection well. As the slug of emulsifying liquid 15 is displaced through swept zone 11, it accumulates oil remaining in that portion of the formation and forms an emulsion with the oil. As the oil content in the emulsion slug 15 increases, the pressure required to displace the slug through swept zone 11 increases, and the increase in pressure is determinable on the surface of the earth and may be used as an indication of the progress of the viscosity development stage of our process. Once the injection pressure has reached a predetermined value which is safely below the fracture pressure of the overburden formation, injection of the drive fluid is terminated and steam injection is resumed.

Figure 2C:
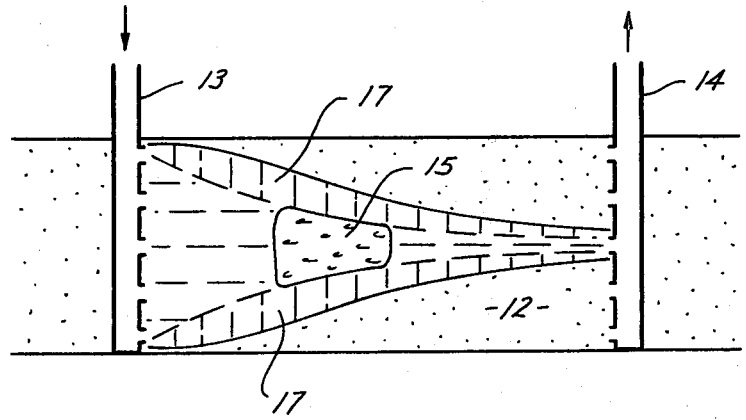

The effectiveness of this embodiment of our invention is illustrated in FIG. 2C, in which steam injected into well 13 passing through the portion of swept zone 11 immediately adjacent the well 13, is forced away from the swept portion because of the presence of the viscous emulsion slug 15. As a consequence, steam invades portions of the formation 17 located above and below the original swept zone of the formation 11, as is shown in FIG. 2C. As steam passes deeper into the formation, traveling from the injection well to the production well, it will re-enter the portion of the swept zone 11 closer to producing well 14, and steam breakthrough will once again be detectable on the surface from the producing well 14. At this point, another slug of emulsifying liquid should be injected into the formation, which as was described above, will plug portions of the formation above and below viscous slug 15, after which steam may once again be injected and forced to invade still other areas of the formation above and below zone 17 swept in the first steam re-injection cycle.

Although as discussed above, any fluid is suitable for displacing the slug of emulsifying liquid away from the injection well, optimum results are obtained by injecting hot water at a temperature somewhat below the boiling point of water at the injection pressure. The liquid phase is a more effective displacing agent than steam vapor, and it is desirable that emulsion slug 15 retain its integrity in order to plug the channel 11. Hot water is superior to cold water, since it is not desired to reduce the temperature of the portion of the formation into which steam will be injected in the subsequent steps in order to minimize thermal inefficiencies.

The aqueous emulsifying liquid to be used in the process of our invention must be tailored very carefully for our process to operate as described above. A surfactant is contained in the emulsifying liquid, although it is different in composition from a surfactant fluid which may be injected into a formation for the purpose of accomplishing surfactant waterflooding in the formation. In the latter case, the surfactant composition is engineered to exhibit low interfacial tension, but such surfactant displays a minimum viscous emulsion forming tendency. By contrast, in the present process, it is desired that the emulsifying tendency be optimized, and this is accomplished by small but significant changes in the molecular characteristic of the surfactants employed, and in the balance between two or more dissimilar surfactants as are frequently utilized for our process.

It is important that the temperature in the steam-swept zone be utilized in tests performed for the purpose of identifying the optimum surfactant or surfactant combination, rather than formation temperature as the steam-swept zone will be hotter than the unswept portion of the formation. Similarly, the salinity of the water present in the swept zone should be determined and utilized in thest tests, rather than the connate water or formation water present in the portions of the formation that has not been swept by steam, since fluid salinity has a strong effect on emulsification tendencies. If the emulsifying liquid surfactants exhibited optimum emulsifying tendencies in a more saline environment such as that present in the unswept portion of the formation, the emulsifying effect would be minimal or non-existant in the lower salinity fluids present in this swept portion of the formation, which would be highly detrimental to the proper functioning of the process of our invention.

The preferred surfactants for use in the process of our invention are the following.

(1) An organic sulfonate, primarily anionic surfactant such as a sodium, potassium, lithium or ammonium salt of petroleum sulfonate having a median equivalent weight between 325 and 450, or a synthetic sulfonate having the formula:

$$RSO_3X$$

wherein R is an alkyl, linear or branched, having from 8 to 24 carbon atoms, or alkylaryl such as benzene or toluene having attached thereto at least one alkyl group, linear or branched, containing from 6 to 18 carbon atoms in the alkyl chain, and X is sodium, potassium, lithium or ammonium.

(2) A solubilizing co-surfactant having the formula:

$$R(OR')_nR''SO_3X$$

wherein R is a linear or branched alkyl having 6 to 24 carbon atoms and preferably 9 to 18 carbon atoms, or an alkylaryl such as benzene or toluene having attached thereto at least one alkyl group, linear or branched, containing from 6 to 18 and preferably from 9 to 15 carbon atoms, R' is ethylene or a mixture of ethylene and higher alkylene such as propylene with relatively more ethylene than higher alkylene, n is a number from 2 to 12, R'' is ethylene, propylene, hydroxy propylene or butylene, and X is sodium, potassium, lithium or ammonium.

A third additive may be needed to ensure desirable emulsion properties including stability and viscosity, which is a low HLB nonionic surfactant such as an ethoxylated aliphatic alcohol, alkanol, alkyl phenol, etc. having the formula:

$$R(OR')_xOH$$

wherein R is aliphatic including alkyl, linear or branched and containing from 8 to 24 carbon atoms, or alkylaryl such as benzene or toluene having attached thereto at least one alkyl group, linear or branched, containing from 6 to 18 carbon atoms, x is a number from 1 to 10, and R' is ethylene or a mixture of ethylene and higher alkylene with relatively more ethylene than alkylene, preferably at least 65% ethylene. The balance between the total number of carbon atoms in R, and x, the number of ethoxy units, is chosen so the surfactant is essentially insoluble in the fluid present in the steam-swept channel. Its function here is to stabilize the emulsion and apparently accomplishes this by swelling the micells and/or forming mixed micells as the emulsion is formed.

In a slightly different embodiment, a $C_2$ to $C_7$ alcohol is also employed in the emulsifying liquid slug in a concentration from about 0.01 to about 10 percent by weight. These alcohols effectively enhance the emulsifying tendency of surfactants and stabilize the emulsion formed. Particularly preferred alcohols are n-butanol and iso pentanol.

The emulsifying fluid can also contain from 0.05 to 15 percent by weight of oil or other non-aqueous material dispersed therein. In order to maintain the desired injectability, the oil content should not exceed a level which raises the viscosity of the fluid at formation temperature to a value greater than five times and preferably not greater than three times the viscosity of water at formation temperature. The maximum allowable oil content should be determined experimentally using crude oil from the formation to be treated. This embodiment results in achieving sufficient viscosity to plug the steam-swept zone more quickly than is possible using an oil-free emulsifying liquid. This feature is especially useful if residual oil saturation in the steam swept zone is unusually low. In some applications, it is preferred that the first portion of the slug injected into the zone be oil free, with the oil added to the latter portion of the slug.

In yet another preferred embodiment of the process of our invention, the aqueous liquid injected into the formation is saturated with an inert gas such as nitrogen, carbon dioxide, methane, natural gas, etc. at the injection temperature and pressure. This preferred embodiment accomplishes yet another mechanism which is additive to the effect of emulsification. As the gas-saturated fluid is displaced through the formation by the drive fluid, it experiences a drop in pressure as it moves away from the injection point. As a consequence of this drop in pressure, gas originally dissolved in the liquid breaks out of solution and forms small gas bubbles or foam. The action of gas coming out of solution provides mixing energy which aids the in situ emulsification reaction. Also, gas bubbles form a three-phase emulsion foam, and significantly increases the viscosity of the resultant plug. Air or other free oxygen containing gases should not be utilized in this embodiment since the temperatures present in the formation are sufficiently high to cause an oxidative reaction to occur which can be detrimental to this particular process.

FIELD EXAMPLE

The following field example is offered for the purpose of additional disclosure, but is not intended to be in any way limitative or restrictive of our invention, which is defined precisely hereinafter by the claims.

A viscous oil formation is located at a depth of 490 feet, and it is determined that the thickness of the formation is 73 feet and the average porosity is 32 percent. The permeability initially to gas is 200 millidarcies. Formation porosity is 32%, and initial oil saturation is 60 percent. The API gravity of the crude oil is 11° API, and the crude is sufficiently viscous that only a few percent recovery is possible by ordinary primary means.

An injection well and production well are drilled into the formation at a distance of 100 feet for purposes of performing a pilot experiment, and both wells are completed throughout the full vertical thickness of the formation. Steam is injected into the formation via the injection well and fluids are produced via the production well, and oil production is observed after only 5 days of injecting 80 percent quality steam at an injection rate of 200 barrels per day. After only 5000 barrels have been recovered from the formation, however, the water-oil ratio begins rising, signifying that steam condensate is breaking through at the producing well. It is expected that if steam injection were continued, breakthrough of live steam at the production well would occur fairly soon, and oil production would drop essentially to zero fairly soon thereafter.

The pore volume of formation which would be swept by a fluid applied to such a formation if essentially 100 percent vertical conformance were being obtained is estimated as shown below. On the basis of ¼ of an inverted five-spot pattern and assuming that the residual oil saturation is 10 percent ($S_{or}=0.10$)

Pore volume = $(100 \times (100/2) \times 73)$ ft$^3 \times (0.178$ bbl/ft$^3) \times 0.32$ = 20,790 bbls.

The above calculation assumes all injected fluid is recovered; that the capture ratio is 1:0, and that half of the injected heat is lost. Since the volume of oil recovered from this deposit at this stage was only 10 percent, it is determined that serious steam channeling is occurring, and that the total average volumetric efficiency is only 12 percent.

A quantity of emulsifying liquid is prepared equal to about 20 percent of the volume of formations swept by steam in the first steam injection phase. This is prepared by adding 1.0 percent by weight of a commercially available petroleum sulfonate having a median equivalent weight of 375 plus 0.5 percent of a sodium salt of dodecylbenzenetetraethoxyethylene sulfonate plus 0.2 percent by weight of a three-mole ethylene oxide adduct of nonyl phenol. This slug o emulsifying liquid is prepared in field water having a salinity of only 800 parts per million. The surfactants were chosen on a basis of optimum viscous emulsion formulation at this salinity, since it is estimated that this is the average salinity in the steam-swept portion of the formation. This quantity of emulsifying liquid is injected into the formation and displaced away from the injection well by 210° water, and the injection pressure is monitored continually during this phase of the oil recovery program. Injection pressure rises, slowly at first, and then more rapidly, and hot water injection is terminated when the injection pressure reaches a value of 100 pounds per square inch. This signifies that the emulsifying slug has been displaced away from the injection well, and in the course of passing through the steam-swept zone has accumulated and emulsified sufficient oil to develop adequate viscosity to plug the steam-swept channel in the formation. Hot water injection is then terminated and steam injection is begun again in approximately the same way as is described above. After 4 days of steam injection, oil production begins rising and ultimately reaches a value of 50 barrels per day. After 20 days of oil production at an average rate of 30 barrels per day, the oil-water ratio declines and when it reaches a value of 40, another slug of emulsifying liquid is injected, displaced with hot water, followed by steam injection. This process is continued through 15 cycles of injecting steam followed by injecting slugs of emulsifying liquid, which finally results in 83% recovery.

LABORATORY EXPERIMENT

For the purpose of illustrating the operability of our invention and showing the magnitude of the improvement realized from application thereof, the following experiments were performed. Two steam floods were performed in an 18 centimeter cell packed with silty sand. In the first test, 90 percent quality steam was injected into the formation for 3.65 hours and the injection pressure was monitored continually during this period. The results are shown graphically in the attached FIG. 3, in which curve 18 illustrates the steam injection pressure for the straight steam run according to the teachings of the prior art. It can be seen that injection pressure rose rapidly at first and then dropped after only about 15 minutes and equilibrated at a very low level at about 1 hour of steam injection, and remained near that level for the next 2 ½ hours. The drop in injection pressure clearly shows that a swept zone forming a high permeability path between the injection and production point formed in the cell, and allowed steam channeling to occur in the cell. After completion of better than 3 hours of steam injection, the residual oil saturation in this cell was 20 percent (From an $S_{Oi}=77$ percent). In the second experiment, following the process of our invention, the surfactant slug equal to 20 percent of the pore volume of the cell was injected into the formation. This slug contained 20 percent by weight of SA 597 , a sodium dodecylbenzene sulfonate. After this was displaced into the cell, steam injection was initiated and again the steam injection pressure was monitored continually. The results are shown graphically by curve 19 in FIG. 3, and it can be seen that the steam injection builds slowly over a much longer period of time, peaking after 1 ½ hours of steam injection, and does not begin to fall until after 2 hours of steam injection. The injection pressure was greater after 3 ½ hours in this run than it was after only 15 minutes of steam injection in the steam only run, and never dropped below 1,000 pounds per square inch. At the conclusion of 3 ½ hours of steam injection, the residual oil saturation was 21 percent (From an $S_{oi}=35$ percent). Clearly, it can be seen that the emulsifying slug process of our invention resulted in much more effective resistance to flow in the steam-swept zone than is possible using steam injection alone.

While our invention has been described in terms of a plurality of illustrative embodiments, it is clearly not so limited since many variations thereof will be apparent to persons skilled in the related art without departing from the true spirit and scope of our invention. Similarly, while a mechanism has been proposed for the benefits observed resulting from application of the process of our invention, it is not our intention to be strictly bound by any explanation or theories of operations of the process of our invention. It is our desire and intention that our invention be limited and restricted only by those limitations and restrictions appearing in the claims appended immediately hereinafter below.

We claim:

1. A method of recovering viscous petroleum from a subterranean, viscous petroleum-containing, permeable formation penetrated by at least one injection well and by at least one production well, in fluid communication with the formation, comprising:
   (a) injecting a thermal recovery fluid comprising steam into the formation and producing fluids from the formation via the production well for a predetermined period of time, thereby forming a steam-swept zone in the formation;
   (b) injecting an emulsifying fluid into the steam-swept zone, said emulsifying fluid comprising water having dissolved therein a surfactant capable of forming a viscous emulsion with formation petroleum at the temperature and water salinity present in the steam-swept zone, said water containing the emulsifying surfactant forming a viscous emulsion in the steam-swept zone with residual petroleum present in that zone, thereby decreasing the permeability of that zone, said surfactant comprising an organic sulfonate selected from the group consisting of petroleum sulfonate having a median equivalent weight from 325 to 475, and syntheic sulfonates of the formula

RSO$_3$X wherein R is an alkyl, linear or branched, having from 8 to 24 carbon atoms, or an alkylaryl including benzene or toluene having attached thereto at least one alkyl group, linear or branched, and containing from 6 to 18 carbon atoms in the alkyl chain, and X is sodium, potassium, lithium or ammonium; and
   (c) thereafter injecting steam into the formation well via the injection well and recovering fluids including petroleum from the formation via the producing well.

2. A method as recited in claim 1 wherein the step (a) is continued until steam condensate appears at the production well.

3. A method as recited in claim 1 wherein step (a) is continued until vapor phase stream production occurs at the production well.

4. A method as recited in claim 1 comprising the additional step of displacing the emulsifying fluid away from the injection well by injecting a drive fluid comprising hot water into the formation.

5. A method as recited in claim 4 comprising the additional step of monitoring the injection pressure and ceasing injecting hot water when the injection pressure rises to a preselected value which is less than the pressure which will cause fracture of the overburden formation.

6. A method as recited in claim 1 wherein the emulsifying surfactant also comprises an alkyl or alkylaryl polyalkoxyalkylene sulfonate of the following formula:

R(OR')$_n$R''SO$_3$X wherein R is an alkyl having from 6 to 24 carbon atoms or an alkylaryl containing from 6 to 18 carbon atoms in the alkyl chain, R' is ethylene or a mixture of alkylene and higher alkylene with relatively more ethylene than higher alkylene, n is a number from 2 to 12, R'' is ethylene, propylene, hydroxy propylene or butylene, and X is sodium, potassium, lithium or ammonium.

7. A method as recited in claim 6 wherein the concentration of alkyl or alkylaryl polyalkoxyalkyl sulfonate is from 0.01 to 20 percent by weight.

8. A method as recited in claim 1 wherein the emulsifying fluid also contains a low HLB, relatively insoluble nonionic surfactant of the formula:

R(OR')$_x$OH wherein R is an aliphatic including alkyl having from 8 to 24 carbon atoms, or an alkylaryl having from 6 to 18 carbon atoms in the alkyl chain, R' is ethylene or a mixture of ethylene and higher alkylene with relatively more ethylene than alkylene, x is a number from 1 to 10.

9. A method as recited in claim 8 wherein the concentration of low HLB nonionic surfactant is from 0.01 to 10 percent by weight.

10. A method as recited in claim 1 wherein the emulsifying fluid also contains an alcohol having from 2 to 7 carbon atoms.

11. A method as recited in claim 10 wherein the concentration of alcohol is from 0.01 to 10 percent by weight.

12. A method as recited in claim 1 wherein the water containing the emulsifying surfactant is saturated with an inert gas at the injection pressure.

13. A method as recited in claim 12 wherein the inert gas is selected from the group consisting of nitrogen, methane, carbon dioxide, natural gas and mixtures thereof.

14. A method as recited in claim 1 comprising the additional steps of injecting additional slugs of the emulsifying fluid followed by injecting steam for a plurality of cycles.

15. A method as recited in claim 1 wherein the volume of the emulsifying fluid is from 1 to 50 percent of the pore volume of the swept portion of the formation.

16. A method as recited in claim 1, wherein the concentration of organic sulfonate is from 0.01 to 20 percent by weight.

17. A method as recited in claim 1 wherein the emulsifying liquid also contains an amount of hydrocarbon less than the amount which would raise the viscosity of the emulsifying fluid to a value equal to five times the viscosity of water at the temperature of the swept zone.

18. A method as recited in claim 1 wherein the emulsifying liquid also contains an amount of hydrocarbon less than the amount which would raise the viscosity of the emulsifying fluid to a value equal to three times the viscosity of water at the temperature of the swept zone.

19. A method as recited in claim 1 wherein the emulsifying fluid is injected into the steam-swept zone by means of the same well as was utilized for injecting steam.

20. A method as recited in claim 1 wherein the emulsifying fluid is injected into the steam-swept zone by means of the same well as was utilized for recovering petroleum.

21. A method of recovering viscous petroleum from a subterranena, viscous petroleum-containing, permeable formation penetrated by at least one injection well and by at least one production well, both wells being in fluid communication with the formation, comprising:

(a) injecting a thermal recovery fluid comprising steam into the formation and producing fluids from the formation via the production well for a predetermined period of time, thereby forming a steam-swept zone in the formation;

(b) injecting an emulsifying fluid into the steam-swept zone, said emulsifying fluid comprising water having dissolved therein a surfactant capable of forming a viscous emulsion with formation petroleum at the temperature and water salinity present in the steam-swept zone, and a low HLB, relatively insoluble nonionic surfactant of the formula:

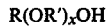

R(OR')$_x$OH wherein R is an aliphatic including alkyl having from 8 to 24 carbon atoms, or an alkylaryl having from 6 to 18 carbon atoms in the alkyl chain, R' is ethylene or a mixture of ethylene and higher alkylene with relatively more ethylene than alkylene, x is a number from 1 to 10, said fluid forming a viscous emulsion in the steam-swept zone with residual petroleum present in that zone, thereby decreasing the permeability of that zone; and (c) thereafter injecting steam into the formation well via the injection well and recovering fluids including petroleum from the formation via the producing well.

22. A method of recovering viscous petroleum from a subterranean, viscous petroleum-containing, permeable formation penetrated by at least one injection well and by at least one production well, both wells being in fluid communication with the formation, comprising:

(a) injecting a thermal recovery fluid comprising steam into the formation and producing fluids from the formation via the production well for a predetermined period of time, thereby forming a steam-swept zone in the formation;

(b) injecting an emulsifying fluid into the steam-swept zone, said emulsifying fluid comprising water having dissolved therein a surfactant capable of forming a viscous emulsion with formation petroleum at the temperature and water salinity present in the steam-swept zone, and being saturated with an inert gas at the injection pressure, said fluid forming a viscous emulsion in the steam-swept zone with residual petroleum present in that zone, thereby decreasing the permeability of that zone; and (c) thereafter injecting steam into the formation well via the injection well and recovering fluids including petroleum from the formation via the producing well.

23. A method as recited in claim 22 wherein the inert gas is selected from the group consisting of nitrogen, methane, carbon dioxide, natural gas and mixtures thereof.

24. A method of recovering viscous petroleum from a subterranean, viscous petroleum-containing, permeable formation penetrated by at least one injection well and by at least one production well, both wells being in fluid communication with the formation, comprising:

(a) injecting a thermal recovery fluid comprising steam into the formation and producing fluids from the formation via the production well for a predetermined period of time, thereby forming a steam-swept zone in the formation;

(b) injecting an emulsifying fluid into the steam-swept zone by means of the same well as was used for recovering petroleum, said emulsifying fluid comprising water having dissolved therein a surfactant capable of forming a viscous emulsion with formation petroleum at the temperature and water salinity present in the steam-swept zone, said water containing the emulsifying surfactant forming a viscous emulsion in the steam swept zone with residual petroleum present in that zone, thereby decreasing the permeability of that zone; and (c) thereafter injecting steam into the formation well via the injection well and recovering fluids including petroleum from the formation via the producing well.

* * * * *